(12) United States Patent
Liu et al.

(10) Patent No.: US 11,080,553 B2
(45) Date of Patent: Aug. 3, 2021

(54) IMAGE SEARCH METHOD AND APPARATUS

(71) Applicant: BOE Technology Group Co., Ltd., Beijing (CN)

(72) Inventors: Xiangyang Liu, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 202 days.

(21) Appl. No.: 16/376,207

(22) Filed: Apr. 5, 2019

(65) Prior Publication Data

US 2020/0104632 A1 Apr. 2, 2020

(30) Foreign Application Priority Data

Sep. 29, 2018 (CN) .......................... 201811145570.4

(51) Int. Cl.
| | | |
|---|---|---|
| *G06K 9/62* | (2006.01) | |
| *G06F 16/583* | (2019.01) | |
| *G06F 16/51* | (2019.01) | |
| *G06F 16/54* | (2019.01) | |
| *G06F 16/532* | (2019.01) | |
| *G06F 3/0482* | (2013.01) | |

(Continued)

(52) U.S. Cl.
CPC ......... *G06K 9/6215* (2013.01); *G06F 3/0482* (2013.01); *G06F 16/51* (2019.01); *G06F 16/532* (2019.01); *G06F 16/54* (2019.01); *G06F 16/583* (2019.01); *G06K 9/4671* (2013.01); *G06K 9/6202* (2013.01); *G06K 9/6257* (2013.01); *G06N 3/04* (2013.01); *G06N 3/08* (2013.01); *G06K 9/40* (2013.01)

(58) Field of Classification Search
CPC .......... G06K 9/62; G06K 9/46; G06F 3/0482; G06F 16/532; G06F 16/583; G06F 16/51; G06F 16/54; G06N 3/04; G06N 3/08
See application file for complete search history.

(56) References Cited

U.S. PATENT DOCUMENTS 10,521,693 B1 * 12/2019 Knas ................... G06K 9/00302
10,599,953 B2 * 3/2020 Brown ................. G06K 9/6263
(Continued)

FOREIGN PATENT DOCUMENTS

| CN | 104112005 A | 10/2014 |
|---|---|---|
| CN | 105787876 A | 7/2016 |
| CN | 107316053 A | 11/2017 |

OTHER PUBLICATIONS

First Office Action, including Search Report, for Chinese Patent Application No. 201811145570.4, dated Mar. 19, 2020, 39 pages.
(Continued)

*Primary Examiner* — Mia M Thomas
(74) *Attorney, Agent, or Firm* — Westman, Champlin & Koehler, P.A.

(57) ABSTRACT

An image search method and an apparatus may include acquiring an image to be searched; extracting a multi-scale feature of the image to be searched; determining a hash value of the image to be searched according to the multi-scale feature; and obtaining original images similar to the image to be searched by comparing the multi-scale feature of the image to be searched with a multi-scale feature of each original image corresponding to a hash bucket to which the hash value belongs.

19 Claims, 7 Drawing Sheets

(51) Int. Cl.
*G06K 9/46* (2006.01)
*G06N 3/04* (2006.01)
*G06N 3/08* (2006.01)
*G06K 9/40* (2006.01)

(56) References Cited

U.S. PATENT DOCUMENTS

| | | | | |
|---|---|---|---|---|
| 10,713,229 | B2* | 7/2020 | Liu | G06F 16/2246 |
| 10,754,638 | B1* | 8/2020 | Dwivedi | H04L 67/025 |
| 10,775,976 | B1* | 9/2020 | Abdul-Jawad | G06F 3/0484 |
| 10,839,006 | B2* | 11/2020 | Hsiao | G06F 16/583 |
| 2009/0259633 | A1* | 10/2009 | Bronstein | G11B 27/11 |
| 2010/0011392 | A1* | 1/2010 | Bronstein | H04N 21/4756 |
| | | | | 725/28 |
| 2011/0317010 | A1* | 12/2011 | Dhanapal | G06K 9/00785 |
| | | | | 348/143 |
| 2014/0086492 | A1* | 3/2014 | Iwamura | G06K 9/62 |
| | | | | 382/190 |
| 2015/0016668 | A1* | 1/2015 | Cheriyadat | G06K 9/4642 |
| | | | | 382/103 |
| 2015/0023596 | A1* | 1/2015 | Oami | G06K 9/3241 |
| | | | | 382/173 |
| 2015/0220808 | A1* | 8/2015 | White | G06K 9/00362 |
| | | | | 382/209 |
| 2015/0227557 | A1* | 8/2015 | Holzschneider | G06T 11/60 |
| | | | | 382/218 |
| 2017/0053182 | A1 | 2/2017 | Cheng et al. | |
| 2017/0068671 | A1* | 3/2017 | Ramanathan | G06F 16/9014 |
| 2019/0332849 | A1* | 10/2019 | Gupta | G06K 9/00275 |
| 2020/0257890 | A1* | 8/2020 | Pu | G06K 9/00228 |

OTHER PUBLICATIONS

Zhou Shuren et al. "Deep Hashing Method for Image Retrieval Based on Multi-Scale Features", Journal of Frontiers of Computer Science and Technology, DOI: 10.3778/j.issn.1673-9418.1709060, dated Jan. 18, 2018, pp. 1974-1986 (35 pages total).

* cited by examiner

IMAGE SEARCH METHOD AND APPARATUS

CROSS-REFERENCE TO RELATED APPLICATION(S)

This application claims priority to the Chinese Patent Application No. 201811145570.4, filed on Sep. 29, 2018, which is incorporated herein by reference in its entirety.

TECHNICAL FIELD

The present disclosure relates to the field of image processing technologies, and more particularly, to an image search method and apparatus.

BACKGROUND

In a conventional image search method, an image to be searched is directly compared with each original image in an image library to determine an image similar to the image to be searched, which causes a large comparison workload, and less reference features during the comparison, thereby resulting in a long search time and poor search efficiency.

SUMMARY

Embodiments according to a first aspect of the present disclosure propose an image search method, comprising:
acquiring an image to be searched;
extracting a multi-scale feature of the image to be searched;
determining a hash value of the image to be searched according to the multi-scale feature; and
obtaining original images similar to the image to be searched by comparing the multi-scale feature of the image to be searched with a multi-scale feature of each original image corresponding to a hash bucket to which the hash value belongs.

In an embodiment, before obtaining the original images similar to the image to be searched, the method further comprises:
acquiring a plurality of original images;
extracting a multi-scale feature of each of the original images, and determining a hash value of the original image according to the multi-scale feature of the original image;
generating an index library according to the original images and hash values of the original images, wherein the index library comprises at least one hash bucket, and each of the at least one hash bucket comprises at least one of correspondences between the hash values and the original images; and
generating a multi-scale feature library according to the original images and multi-scale features of the original images, wherein the multi-scale feature library comprises at least one correspondence between the original images and the multi-scale features.

In an embodiment, the method further comprises:
extracting a scale-invariant feature of the image to be searched; and
obtaining original images identical to the image to be searched by comparing the scale-invariant feature of the image to be searched with a scale-invariant feature of each original image corresponding to the hash bucket to which the hash value belongs.

In an embodiment, before obtaining the original images identical to the image to be searched, the method further comprises:
extracting a scale-invariant feature of each of the original images; and
generating a scale-invariant feature library according to the original images and scale-invariant features of the original images, wherein the scale-invariant feature library comprises at least one correspondence between the original images and the scale-invariant features.

In an embodiment, before extracting the multi-scale feature of the image to be searched, the method further comprises:
removing interference information from the image to be searched.

In an embodiment, obtaining the original images similar to the image to be searched comprises:
determining, for each original image, a first similarity between the original image and the image to be searched by comparing a multi-scale feature of the original image with the multi-scale feature of the image to be searched; and
determining the original image to be an original image similar to the image to be searched when the first similarity satisfies a first threshold.

In an embodiment, obtaining the original images identical to the image to be searched comprises:
determining, for each original image, a second similarity between the original image and the image to be searched by comparing a scale-invariant feature of the original image with the scale-invariant feature of the image to be searched; and
determining the original image to be the original images identical to the image to be searched when the second similarity satisfies a second threshold.

In an embodiment, before obtaining the original images similar to the image to be searched, the method further comprises:
adding first interference information in the plurality of original images to obtain first images, wherein the first interference information is consistent with interference information existing in the image to be searched from which the interference information has been removed;
adding second interference information in the original images to obtain second images, wherein the second interference information is consistent with interference information existing in the image to be searched from which the interference information has not been removed;
extracting and storing multi-scale features in the first images; and
extracting and storing multi-scale features in the second images.

In an embodiment, obtaining the original images similar to the image to be searched comprises:
determining whether the interference information has been removed from the image to be searched;
obtaining the original images similar to the image to be searched by comparing the multi-scale feature of the image to be searched with the multi-scale features of the first images corresponding to the respective original images if the interference information has been removed from the image to be searched; and
obtaining the original images similar to the image to be searched by comparing the multi-scale feature of the image to be searched with the multi-scale features of the second images corresponding to the respective original images if the interference information has not been removed from the image to be searched.

In an embodiment, after obtaining the original images similar to the image to be searched, the method further comprises:

displaying thumbnails corresponding to the respective similar original images;

acquiring a selection request from a user, wherein the selection request comprises a thumbnail selected by the user; and acquiring an original image according to the thumbnail selected by the user, and pushing the original image to a painting screen for display.

In an embodiment, the multi-scale feature and the hash value of the image to be searched are obtained by inputting the image to be searched into a deep hash model, and the deep hash model comprises at least three layers of convolutional neural networks, wherein an output of an intermediate layer of convolutional neural network comprises multi-scale features and hash values, and an output of a last layer of convolutional neural network is labels in images and a value indicating whether the two images are the same.

In an embodiment, the deep hash model is trained according to training data comprising a plurality of training samples, and each of the training samples comprises: two images, labels in the two images, and a value indicating whether the two images are the same.

Embodiments according to a second aspect of the present disclosure propose an image search apparatus, comprising:

an acquisition circuit configured to acquire an image to be searched;

an extraction circuit configured to extract a multi-scale feature of the image to be searched;

a determination circuit configured to determine a hash value of the image to be searched according to the multi-scale feature; and an obtaining circuit configured to obtain original images similar to the image to be searched by comparing the multi-scale feature of the image to be searched with a multi-scale feature of each original image corresponding to a hash bucket to which the hash value belongs.

In an embodiment, the acquisition circuit is further configured to acquire a plurality of original images; the extraction circuit is further configured to extract a multi-scale feature of each of the original images, and the determination circuit is further configured to determine a hash value of the original image according to the multi-scale feature of the original image; and the apparatus further comprises: a generation circuit configured to generate an index library according to the original images and hash values of the original images, wherein the index library comprises at least one hash bucket, and each of the at least one hash bucket comprises at least one of correspondences between the hash values and the original images;

wherein the generation circuit is further configured to generate a multi-scale feature library according to the original images and multi-scale features of the original images, wherein the multi-scale feature library comprises at least one correspondence between the original images and the multi-scale features.

In an embodiment, the extraction circuit is further configured to extract a scale-invariant feature of the image to be searched; and the obtaining circuit is further configured to obtain original images identical to the image to be searched by comparing the scale-invariant feature of the image to be searched with a scale-invariant feature of each original image corresponding to the hash bucket to which the hash value belongs.

In an embodiment, the extraction circuit is further configured to extract a scale-invariant feature of each of the original images; and the generation circuit is further configured to generate a scale-invariant feature library according to the original images and scale-invariant features of the original images, wherein the scale-invariant feature library comprises at least one correspondence between the original images and the scale-invariant features.

In an embodiment, the apparatus further comprises:

an adding circuit configured to add first interference information in the plurality of original images to obtain first images, wherein the first interference information is consistent with interference information existing in the image to be searched from which the interference information has been removed;

wherein the adding circuit is further configured to add second interference information in the original images to obtain second images, wherein the second interference information is consistent with interference information existing in the image to be searched from which the interference information has not been removed;

the extraction circuit is further configured to extract and store multi-scale features in the first images; and the extraction circuit is further configured to extract and store multi-scale features in the second images.

In an embodiment, the obtaining circuit is further configured to determine whether the interference information has been removed from the image to be searched;

obtain the original images similar to the image to be searched by comparing the multi-scale feature of the image to be searched with the multi-scale features of the first images corresponding to the respective original images if the interference information has been removed from the image to be searched; and obtain the original images similar to the image to be searched by comparing the multi-scale feature of the image to be searched with the multi-scale features of the second images corresponding to the respective original images if the interference information has not been removed from the image to be searched.

Embodiments according to a third aspect of the present disclosure propose an image search device, comprising:

a memory, a processor and a computer program stored on the memory and executable on the processor, wherein the program, when executed by the processor, implements the image search method described above.

Embodiments according to a fourth aspect of the present disclosure propose a non-transitory computer readable storage medium, having stored thereon a computer program which, when executed by a processor, implements the image search method described above.

Additional aspects and advantages of the present disclosure will be set forth in part in the description which follows, and in part will be obvious from the description, or may be learned by practice of the present disclosure.

BRIEF DESCRIPTION OF THE ACCOMPANYING DRAWINGS

The above and/or additional aspects and advantages of the present disclosure will become apparent and readily understandable from the following description of the embodiments in conjunction with accompanying drawings, in which.

DETAILED DESCRIPTION

The embodiments of the present disclosure will be described in detail below, and examples of the embodiments are illustrated in the accompanying drawings, throughout which the same or similar reference signs are used to refer to the same or similar elements or elements having the same or similar functions. The embodiments described below with reference to the accompanying drawings are illustrative, are intended to explain the present disclosure, and should not be construed as limiting the present disclosure.

The image search method and apparatus according to the embodiments of the present disclosure will be described below with reference to the accompanying drawings.

Figure 1:
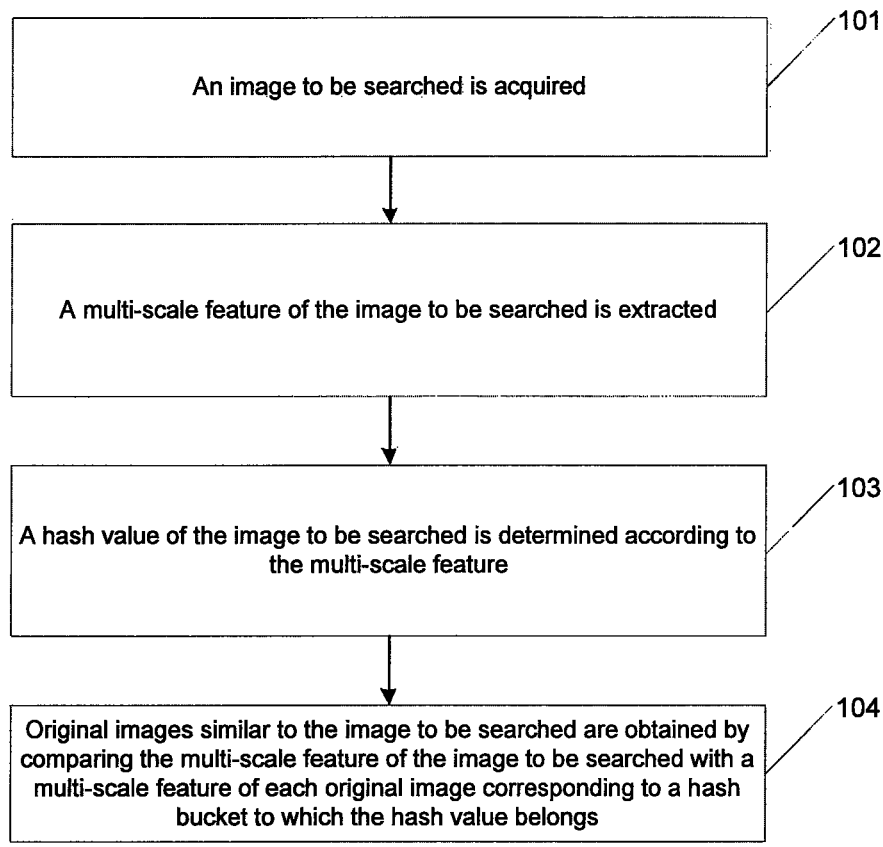
FIG. 1 is a flowchart of an image search method according to an embodiment of the present disclosure.

FIG. 1 is a flowchart of an image search method according to an embodiment of the present disclosure. As shown in FIG. 1, the image search method comprises the following steps.

In S101, an image to be searched is acquired.

An execution body of the image search method according to the present disclosure is an image search apparatus, which may specifically be a hardware device such as a mobile terminal, a server etc., or software installed on the hardware device. In the present embodiment, the description is made by taking the image search apparatus being a background server corresponding to a painting screen APP as an example.

In the present embodiment, the background server may acquire the image to be searched by acquiring the image to be searched from the screen APP. Here, the screen APP may invoke a camera on a mobile terminal to scan, photograph, etc. a real image, so as to acquire the image to be searched, and transmit the image to be searched to the background server. In addition, the painting screen APP may also receive the image to be searched transmitted by other APPs, or acquire a pre-stored image as the image to be searched.

In S102, a multi-scale feature of the image to be searched is extracted.

Figure 2:
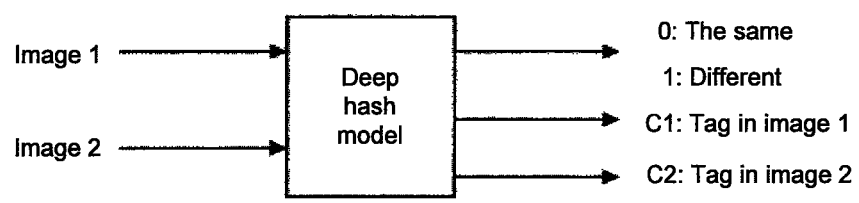
FIG. 2 is a schematic diagram of a deep hash model according to an embodiment of the present disclosure.

In the present embodiment, the multi-scale feature may be, for example, a Convolutional Neural Network (CNN) feature etc. Here, the background server may extract the multi-scale feature of the image to be searched by inputting the image to be searched into a deep hash model, to acquire the multi-scale feature and a hash value of the image to be searched. Here, the deep hash model may comprise at least three layers of convolutional neural networks, wherein an output of an intermediate layer of convolutional neural network comprises multi-scale features and hash values, and an output of a last layer of convolutional neural networks is labels in images and a value indicating whether the two images are the same. For example, when the value is 0, it indicates that the two images are the same; when the value is 1, it indicates that the two images are different. Here, a schematic diagram of the deep hash model may be as shown in FIG. 2. In FIG. 2, an input of the deep hash model and the output of the last layer of convolutional neural network are illustrated.

In the present embodiment, the labels in the images may comprise any one or more of the following parameters: type information, and content in the images. Here, the type information is, for example, animals, plants, landscapes, portraits, etc. The content in the images is, for example, specific animals, people, plants, other objects, etc.

In the present embodiment, initial values of parameters in the deep hash model may be parameters of an image adjustment model existing in an image library, wherein the image adjustment model is, for example, a feature extraction model for feature extraction of an image etc. The parameters are obtained by training and adjusting images in the image library, and are accurate to a certain extent. When the parameters are used as the initial values of the parameters in the deep hash model, the training of the deep hash model may be speeded up, thereby improving the accuracy of the trained deep hash model. The deep hash model may specifically be trained by acquiring training data; and training the deep hash model according to the training data, to adjust values of coefficients in the deep hash model, wherein the training data comprises a plurality of training samples, and each of the training samples comprises two images, labels in the two images, and a value indicating whether the two images are the same; and wherein a body of the deep hash model may be, for example, an AlexNet neural network.

In the present embodiment, before step 102, the method may further comprise a step of removing interference information from the image to be searched. Here, the interference information may comprise any one or more of the following interferences: background information, distortion information, rotation information, etc. In the present embodiment, the interference information is removed from the image to be searched by performing real image scanning on the image to be searched. Here, the interference information may be removed by performing real image scanning using various filters, distortion mathematical models, etc. Here, noise interferences such as the background information may be removed using filters such as mean filters, median filters, adaptive Wiener filters, etc.; and interferences such as the distortion information may be removed using the distortion mathematical models.

In the present embodiment, the removal of the interference information can reduce the interference information in the image to be searched, which reduces the influence of the interference information on similarities, thereby improving the search efficiency.

In S103, a hash value of the image to be searched is determined according to the multi-scale feature.

In the present embodiment, it should be illustrated that the intermediate layer of convolutional neural network of the deep hash model firstly extracts a multi-scale feature of the image to be searched, then determines a hash value according to the multi-scale feature, and subsequently outputs the multi-scale feature and the hash value. Therefore, the hash value of the image to be searched may be acquired in combination with the deep hash model.

In the present embodiment, for two identical or similar images, corresponding multi-scale features also have a high similarity. Therefore, when the hash value is determined according to the multi-scale feature, it enables hash values of identical or similar images to be located in the same hash bucket. Therefore, an image identical or similar to the image to be searched may be determined by comparing with multi-scale features of various images corresponding to the same hash bucket without comparing with multi-scale features of various images in an image library, thereby reducing a number of images which need to be compared, shortening the search time, and improving the search efficiency.

In S104, original images similar to the image to be searched are obtained by comparing the multi-scale feature of the image to be searched with a multi-scale feature of each original image corresponding to a hash bucket to which the hash value belongs.

In the present embodiment, a specific process of performing step 104 by the background server may comprise: acquiring original images corresponding to various hash values in a hash bucket to which the hash value of the image to be searched belongs according to the hash value of the image to be searched; acquiring multi-scale features of various original images; determining, for each original image, a first similarity between the original image and the image to be searched by comparing a multi-scale feature of the original image with the multi-scale feature of the image to be searched; and determining the original image to be an original image similar to the image to be searched when the first similarity satisfies a first threshold, for example, is greater than the first threshold. Here, the original image is an image which may be displayed on a painting screen and has little interference information due to the removal of interference information. When the original image has little interference information, the influence of the interference information on the multi-scale feature can be reduced, which reduces the influence of the interference information on the calculation of the similarity, and can enhance the accuracy of the calculated similarity, thereby improving the search effect.

In the present embodiment, the multi-scale feature of the original image may be multi-scale features of various feature points in the original image. A specific process of determining, by the background server, the first similarity between the original image and the image to be searched may comprise: acquiring a number of feature points in the original image which have the same multi-scale features as those of corresponding feature points in the image to be searched and a total number of feature points in the original image by comparing multi-scale features of various feature points in the original image with multi-scale features of various feature points in the image to be searched, and determining a ratio of the number of feature points in the original image which have the same multi-scale features as those of corresponding feature points in the image to be searched to the total number to be the first similarity between the original image and the image to be searched.

Figure 3:
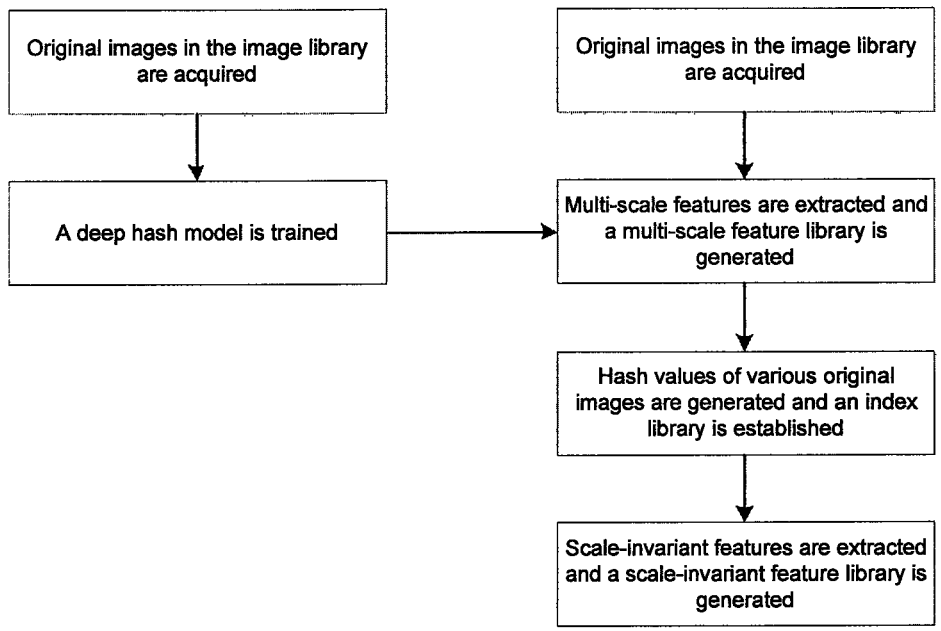
FIG. 3 is a flowchart of establishing an index library, a multi-scale feature library, and a scale-invariant feature library according to an embodiment of the present disclosure.

With reference to FIG. 3, on the basis of the embodiment shown in FIG. 1, before step 104, the method may further comprise a process of establishing an index library, a multi-scale feature library, and a scale-invariant feature library. As shown in FIG. 3, the process may specifically comprise: acquiring original images in the image library; extracting multi-scale features and scale-invariant features of the original images, and determining hash values of the original images according to the multi-scale features of the original images; generating an index library according to the original images and hash values of the original images, wherein the index library comprises at least one hash bucket, and each of the at least one hash bucket comprises at least one of correspondences between the hash values and the original images; generating a multi-scale feature library according to the original images and multi-scale features of the original images, wherein the multi-scale feature library comprises at least one correspondence between the original images and the multi-scale features; and generating a scale-invariant feature library according to the original images and scale-invariant features of the original images, wherein the scale-invariant feature library comprises at least one correspondence between the original images and the scale-invariant features. Then, the index library, the multi-scale feature library, the scale-invariant feature library, and the image library comprising all the original images are stored in a database to be invoked by the background server. The image library is used here, so that when the background server needs to push an image to a painting screen, the image may be acquired by the background server from the image library and pushed to the painting screen.

In the present embodiment, there are a plurality of original images. After the plurality of original images and hash values of the original images are acquired, a hash bucket to which a hash value of each of the original images belongs may be determined according to the hash value, and then the original image and hash value of the original image are added in the corresponding hash bucket, so as to obtain an index library. Here, each hash bucket corresponds to a hash value range, and comprises various hash values within the hash value range and corresponding original images, and the hash values are in one-to-one correspondence with the respective original images.

According to an embodiment, after step 104, the method may further comprise steps of displaying thumbnails corresponding to the respective similar original images; acquiring a selection request from a user, wherein the selection request comprises a thumbnail selected by the user; and acquiring a corresponding original image according to the thumbnail selected by the user, and pushing the original image to a painting screen for display.

In the present embodiment, the background server may transmit the thumbnails corresponding to the respective similar original images to the painting screen APP, and the painting screen APP displays the thumbnails corresponding to the respective similar original images on an interface of the mobile terminal, so that the user selects one of the thumbnails to be displayed on the painting screen. After the painting screen APP receives the thumbnail selected by the user, the painting screen APP transmits a selection request carrying the thumbnail to the background server, so that the background server pushes an original image corresponding to the thumbnail to the painting screen for display.

In the image search method according to the embodiment of the present disclosure, an image to be searched is acquired; a multi-scale feature of the image to be searched is extracted; a hash value of the image to be searched is determined according to the multi-scale feature; and original images similar to the image to be searched are obtained by comparing the multi-scale feature of the image to be searched with a multi-scale feature of each original image corresponding to a hash bucket to which the hash value belongs, thereby reducing a number of images which need to be compared, shortening the search time, and improving the search efficiency.

Figure 4:
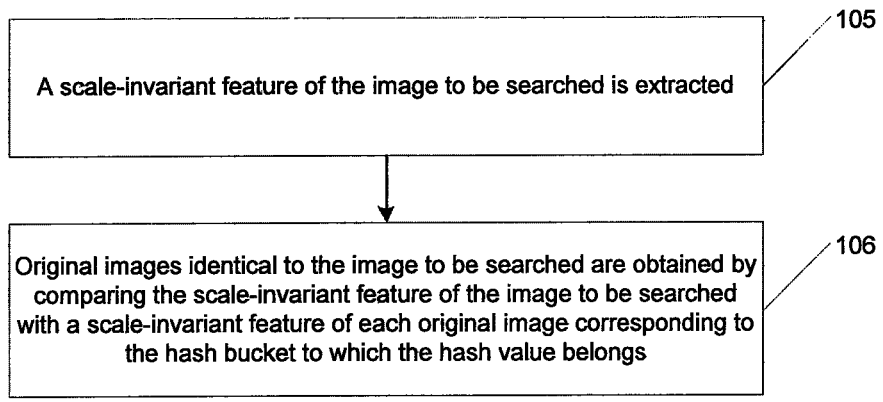
FIG. 4 is a flowchart of another image search method according to an embodiment of the present disclosure.

FIG. 4 is a flowchart of another image search method according to an embodiment of the present disclosure. As shown in FIG. 4, on the basis of the embodiment shown in FIG. 1, the method may further comprise the following steps.

In S105, a scale-invariant feature of the image to be searched is extracted.

In the present embodiment, the scale-invariant feature may be, for example, a Scale-invariant Feature Transform (SIFT) feature etc., or a cluster feature generated according to the SIFT feature etc. When the scale-invariant feature is the cluster feature generated according to the SIFT feature, the background server may extract the scale-invariant feature of the image to be searched by extracting SIFT feature points of the image to be searched, and inputting the SIFT feature points into a preset word bag model to cluster the SIFT feature points into K classes, so as to obtain a K-dimensional word bag model feature vector corresponding to the image to be searched.

In S106, original images identical to the image to be searched are obtained by comparing the scale-invariant feature of the image to be searched with a scale-invariant feature of each original image corresponding to the hash bucket to which the hash value belongs.

In the present embodiment, a specific process of performing step 106 by the background server may comprise: acquiring original images corresponding to various hash values in the hash bucket to which the hash value of the image to be searched belongs according to the hash value of the image to be searched; acquiring scale-invariant features of various original images; determining, for each original image, a second similarity between the original image and the image to be searched by comparing a scale-invariant feature of the original image with the scale-invariant feature of the image to be searched; and determining the original image to be the original images identical to the image to be searched when the second similarity satisfies a second threshold.

In an embodiment, before step 106, the method may further comprise steps of acquiring original images in the image library; extracting a scale-invariant feature of each of the original images; and generating a scale-invariant feature library according to the original images and scale-invariant features of the original images, wherein the scale-invariant feature library comprises at least one correspondence between the original images and the scale-invariant features.

Figure 5:
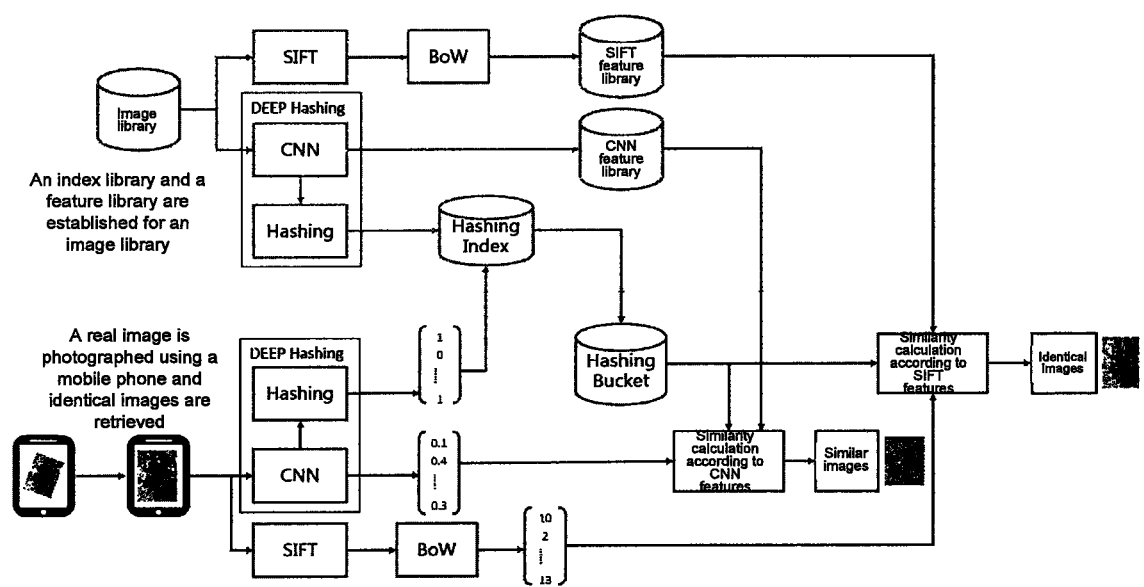
FIG. 5 is a schematic diagram of performing an image search method by a background server according to an embodiment of the present disclosure.

In the present embodiment, the principle of the image search method performed by the background server may be specifically as shown in FIG. 5, and comprises, in FIG. 5, a process of establishing an index library, a multi-scale feature CNN library, and a scale-invariant feature SIFT library, and a specific image search process. Here, the process of establishing an index library, a multi-scale feature CNN library, and a scale-invariant feature SIFT library comprises: acquiring original images in the image library, extracting SIFT features in the original images, and generating an SIFT feature library; extracting CNN features in the original images, and generating a CNN feature library; and calculating a hash value of each of the original images according to a CNN feature of the original image, determining an index of a hash bucket to which the hash value belongs, and adding the original image and the hash value in the corresponding hash bucket.

The specific image search process comprises: the painting screen APP installed on the mobile terminal performing scanning or photographing to acquire an image, performing real image scanning on the image, and removing interferences such as rotation etc., to obtain an image to be searched; extracting a CNN feature and an SIFT feature in the image to be searched; calculating a hash value of the image to be searched according to the CNN feature, determining an index of a hash bucket to which the hash value belongs, and determining the corresponding hash bucket; calculating a similarity between the CNN feature of the image to be searched and a CNN feature of each original image corresponding to the corresponding hash bucket to determine an image similar to the image to be searched; and calculating a similarity between the SIFT feature of the image to be searched and an SIFT feature of each original image corresponding to the corresponding hash bucket to obtain images identical to the image to be extracted.

In the present embodiment, an image to be searched is acquired; a multi-scale feature and a scale-invariant feature of the image to be searched are extracted; a hash value of the image to be searched is determined according to the multi-scale feature; original images similar to the image to be extracted are obtained by comparing the multi-scale feature of the image to be searched with a multi-scale feature of each original image corresponding to a hash bucket to which the hash value belongs; original images identical to the image to be extracted are obtained by comparing the scale-invariant feature of the image to be searched with a scale-invariant feature of each original image of the hash bucket to which the hash value belongs, so that thumbnails of the identical original images and thumbnails of the similar original images may be displayed to the user, and thereby the user may select a thumbnail from the thumbnails of the identical original images and the thumbnails of the similar original images to acquire an original image corresponding to the thumbnail for display. In this way, a number of thumbnails displayed is increased, which enables the user to select a desired thumbnail from various thumbnails, thereby further improving the search efficiency.

Figure 6:
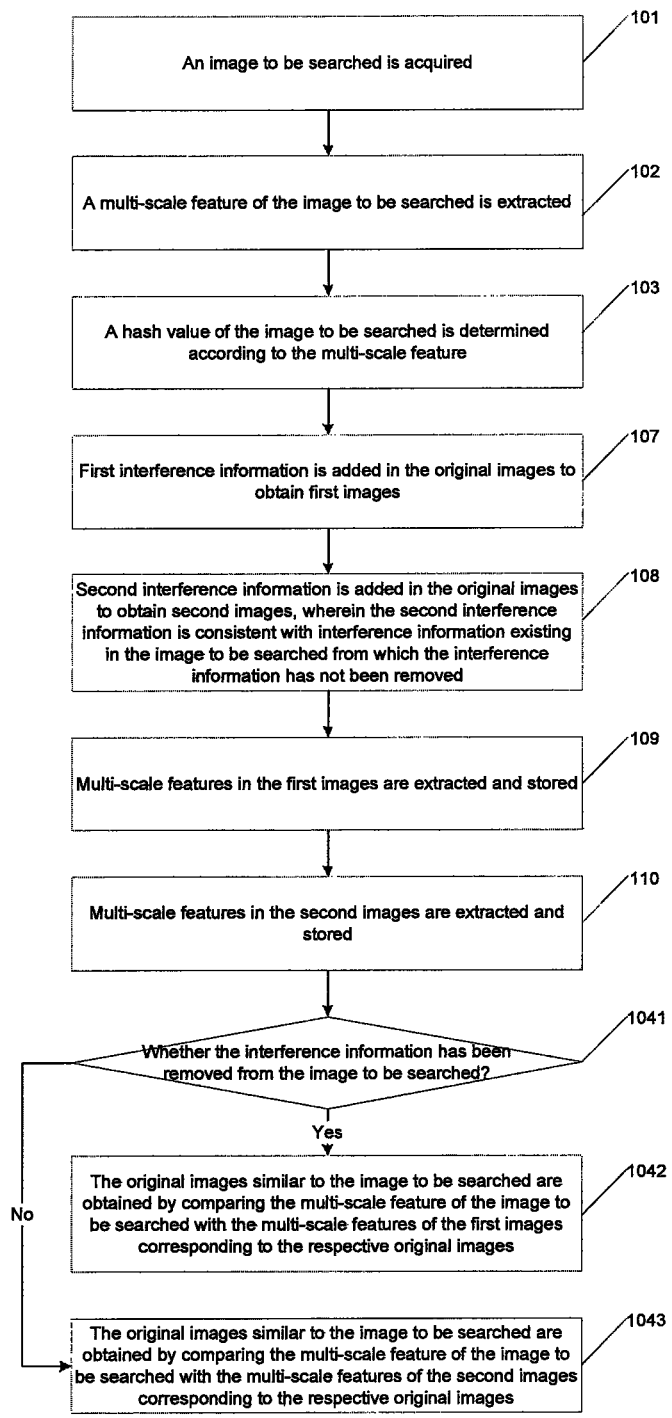
FIG. 6 is a flowchart of yet another image search method according to an embodiment of the present disclosure.

FIG. 6 is a flowchart of yet another image search method according to an embodiment of the present disclosure. As shown in FIG. 6, on the basis of the embodiment shown in FIG. 1 or FIG. 4, before step 104, the method may further comprise the following steps.

In S107, first interference information is added in the original images to obtain first images, wherein the first interference information is consistent with interference information existing in the image to be searched from which the interference information has been removed.

In S108, second interference information is added in the original images to obtain second images, wherein the second interference information is consistent with interference information existing in the image to be searched from which the interference information has not been removed.

In S109, multi-scale features in the first images are extracted and stored.

In addition, the background server may further extract and store scale-invariant features in the first images.

In S110, multi-scale features in the second images are extracted and stored.

In addition, the background server may further extract and store scale-invariant features in the second images.

Here, an execution order of steps 107 and 108 may be interchanged, and an execution order of steps 109 and 110 may be interchanged, which is not limited here.

Correspondingly, step 104 may specifically comprise the following steps.

In S1041, it is determined whether the interference information has been removed from the image to be searched.

In S1042, the original images similar to the image to be searched are obtained by comparing the multi-scale feature of the image to be searched with the multi-scale features of the first images corresponding to the respective original images if the interference information has been removed from the image to be searched.

In addition, during comparison of the scale-invariant features, the original images identical to the image to be searched are obtained by comparing the scale-invariant feature of the image to be searched with the scale-invariant features of the first images corresponding to the respective original images if the interference information has been removed from the image to be searched.

In S1043, the original images similar to the image to be searched are obtained by comparing the multi-scale feature of the image to be searched with the multi-scale features of the second images corresponding to the respective original images if the interference information has not been removed from the image to be searched.

In addition, during comparison of the scale-invariant features, the original images identical to the image to be searched are obtained by comparing the scale-invariant feature of the image to be searched with the scale-invariant features of the second images corresponding to the respective original images if the interference information has not been removed from the image to be searched.

Specifically, in the present embodiment, the background server primarily removes the interference information from the image to be searched by performing real image scanning on the image to be searched. Therefore, the interference information has been removed from the image to be searched if the real image scanning function is successful; and the interference information has not been removed from the image to be searched if the real image scanning function fails. Here, if the real image scanning function is successful, the image to be searched has a smaller amount of background, smaller keystone distortion, and a smaller aspect ratio change as compared with the original image. Therefore, it needs to add a small amount of background, small keyston distortion, a small aspect ratio change, and a certain amount of random color, brightness and saturation changes in the original images of the image library, so that the interferences in the image to be searched are consistent with interferences in the original images, thereby further reducing the influence of the interference information on the accuracy of the similarities and improving the image search effect.

If the real image scanning function fails, the image to be searched has a larger amount of background, larger keystone distortion, and a larger aspect ratio change as compared with the original image. Therefore, it needs to add a large amount of background, large keyston distortion, a large aspect ratio change, and a certain amount of random color, brightness and saturation changes in the original images of the image library, so that the interferences in the image to be searched are consistent with the interferences in the original images, thereby further reducing the influence of the interference information on the accuracy of the similarities and improving the image search effect.

In the present embodiment, there is a certain interference in the image to be searched. Even if the interference information has been removed from the image to be searched, there is still a small amount of interference. Since the original image is an image which may be displayed on the painting screen and from which the interference information has been removed and thus the original image has little interference information, a certain amount of interference may be added in the original image, so that the interferences in the image to be searched are consistent with the interferences in the original image, so as to ensure consistency between a number of interferences in the image to be searched and a number of interferences in the original image, thereby further reducing the influence of the interference information on the calculation of the similarities, and further improving the search efficiency.

Figure 7:
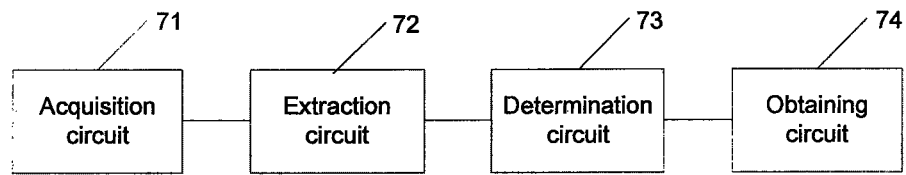
FIG. 7 is a schematic structural diagram of an image search apparatus according to an embodiment of the present disclosure.

FIG. 7 is a structural diagram of an image search apparatus according to an embodiment of the present disclosure. As shown in FIG. 7, the image search apparatus comprises an acquisition circuit 71, an extraction circuit 72, a determination circuit 73, and an obtaining circuit 74.

The acquisition circuit 71 is configured to acquire an image to be searched.

The extraction circuit 72 is configured to extract a multi-scale feature of the image to be searched.

The determination circuit 73 is configured to determine a hash value of the image to be searched according to the multi-scale feature.

The obtaining circuit 74 is configured to obtain original images similar to the image to be searched by comparing the multi-scale feature of the image to be searched with a multi-scale feature of each original image corresponding to a hash bucket to which the hash value belongs.

The image search apparatus according to the present disclosure may specifically be a hardware device such as a mobile terminal, a server etc., or software installed on the hardware device. In the present embodiment, the description is made by taking the image search apparatus being a background server corresponding to a painting screen APP as an example.

In the present embodiment, the background server may acquire the image to be searched by acquiring the image to be searched from the painting screen APP. Here, the painting screen APP may invoke a camera on a mobile terminal to scan, photograph, etc. a real image, so as to acquire the image to be searched, and transmit the image to be searched to the background server. In addition, the painting screen APP may also receive the image to be searched transmitted by other APPs, or acquire a pre-stored image as the image to be searched.

In the present embodiment, the multi-scale feature may be, for example, a Convolutional Neural Network (CNN) feature etc. Here, the background server may extract the multi-scale feature of the image to be searched by inputting the image to be searched into a deep hash model, to acquire the multi-scale feature and a hash value of the image to be searched. Here, the deep hash model may comprise at least three layers of convolutional neural networks, wherein an output of an intermediate layer of convolutional neural network comprises multi-scale features and hash values, and an output of a last layer of convolutional neural networks is labels in images and a value indicating whether the two images are the same. For example, when the value is 0, it indicates that the two images are the same; when the value is 1, it indicates that the two images are different.

In the present embodiment, the labels in the images may comprise any one or more of the following parameters: type information, and content in the images. Here, the type information is, for example, animals, plants, landscapes, portraits, etc. The content in the images is, for example, specific animals, people, plants, other objects, etc.

In the present embodiment, for two identical or similar images, corresponding multi-scale features also have a high similarity. Therefore, when the hash value is determined according to the multi-scale feature, it enables hash values of identical or similar images to be located in the same hash bucket. Therefore, an image identical or similar to the image to be searched may be determined by comparing with multi-scale features of various images corresponding to the same hash bucket without comparing with multi-scale features of various images in an image library, thereby reducing a number of images which need to be compared, shortening the search time, and improving the search efficiency.

On the basis of the above embodiment, the obtaining circuit 74 may specifically be configured to acquire original images corresponding to various hash values in a hash bucket to which the hash value of the image to be searched belongs according to the hash value of the image to be searched; acquire multi-scale features of various original images; determine, for each original image, a first similarity between the original image and the image to be searched by comparing a multi-scale feature of the original image with the multi-scale feature of the image to be searched; and determine the original image to be an original image similar to the image to be searched when the first similarity satisfies a first threshold. Here, the original image is an image which may be displayed on a painting screen and has little interference information due to the removal of interference information.

In the present embodiment, the multi-scale feature of the original image may be multi-scale features of various feature points in the original image. A specific process of determining, by the background server, the first similarity between the original image and the image to be searched may comprise: acquiring a number of feature points in the original image which have the same multi-scale features as those of corresponding feature points in the image to be searched and a total number of feature points in the original image by comparing multi-scale features of various feature points in the original image with multi-scale features of various feature points in the image to be searched, and determining a ratio of the number of feature points in the original image which have the same multi-scale features as those of corresponding feature points in the image to be searched to the total number to be the first similarity between the original image and the image to be searched.

On the basis of the above embodiment, the background server may further be configured to remove interference information from the image to be searched. Here, the interference information may comprise any one or more of the following interferences: background information, distortion information, rotation information, etc. In the present embodiment, the removal of the interference information can reduce the interference information in the image to be searched, which reduces the influence of the interference information on similarities, thereby improving the search efficiency.

Figure 8:
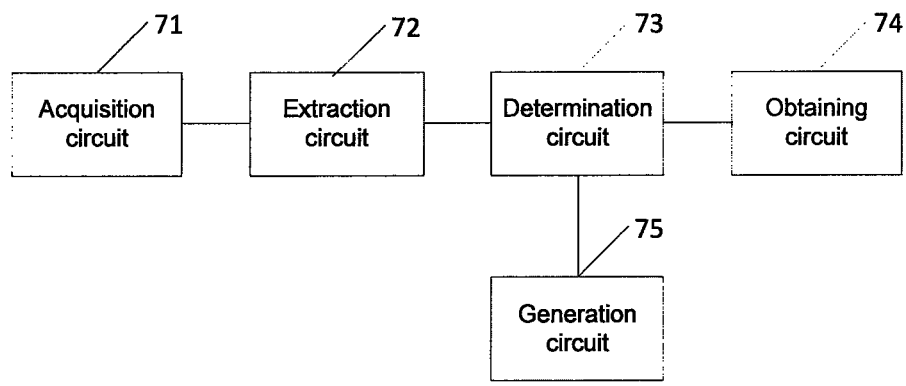
FIG. 8 is a schematic structural diagram of another image search apparatus according to an embodiment of the present disclosure.

Alternatively, with reference to FIG. 8, on the basis of the embodiment shown in FIG. 7, the apparatus may further comprise a generation circuit 75, wherein the acquisition circuit 71 is further configured to acquire a plurality of original images;

the extraction circuit 72 is further configured to extract a multi-scale feature of each of the original images;

the determination circuit 73 is further configured to determine hash values of the original images according to the multi-scale features of the original images;

the generation circuit 75 is configured to generate an index library according to the original images and hash values of the original images, wherein the index library comprises at least one hash bucket, and each of the at least one hash bucket comprises at least one of correspondences between the hash values and the original images; and the generation circuit 75 is further configured to generate a multi-scale feature library according to the original images and multi-scale features of the original images, wherein the multi-scale feature library comprises at least one correspondence between the original images and the multi-scale features.

Figure 9:
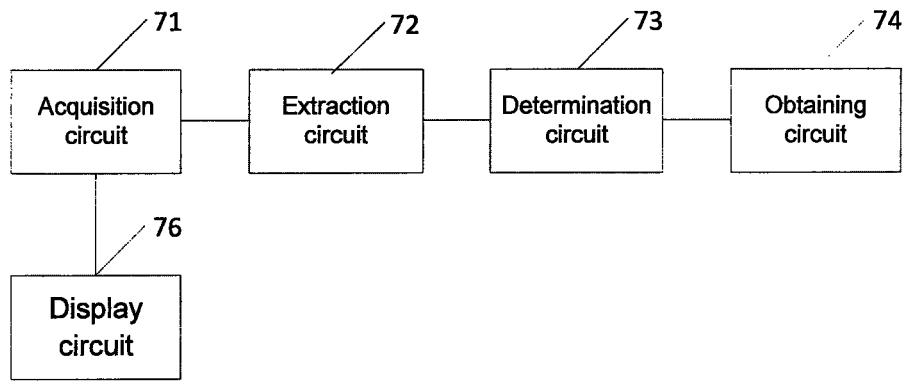
FIG. 9 is a schematic structural diagram of yet another image search apparatus according to an embodiment of the present disclosure.

With reference to FIG. 9, on the basis of the embodiment shown in FIG. 7, the apparatus may further comprise a display circuit 76;

correspondingly, the display circuit 76 is further configured to display thumbnails corresponding to the respective similar original images;

the acquisition circuit 71 is further configured to acquire a selection request from a user, wherein the selection request comprises a thumbnail selected by the user; and the acquisition circuit 71 is further configured to acquire a corresponding original image according to the thumbnail selected by the user, and push the original image to a painting screen for display.

In the present embodiment, the background server may transmit the thumbnails corresponding to the respective similar original images to the painting screen APP, and the painting screen APP displays the thumbnails corresponding to the respective similar original images on an interface of the mobile terminal, so that the user selects one of the thumbnails to be displayed on the painting screen. After the painting screen APP receives the thumbnail selected by the user, the painting screen APP transmits a selection request carrying the thumbnail to the background server, so that the background server pushes an original image corresponding to the thumbnail to the painting screen for display.

In the image search apparatus according to the embodiment of the present disclosure, an image to be searched is acquired; a multi-scale feature of the image to be searched is extracted; a hash value of the image to be searched is determined according to the multi-scale feature; and original images similar to the image to be searched are obtained by comparing the multi-scale feature of the image to be searched with a multi-scale feature of each original image corresponding to a hash bucket to which the hash value belongs, thereby reducing a number of images which need to be compared, shortening the search time, and improving the search efficiency.

On the basis of the above embodiment, the extraction circuit 72 is further configured to extract a scale-invariant feature of the image to be searched.

The obtaining circuit 74 is further configured to obtain original images identical to the image to be searched by comparing the scale-invariant feature of the image to be searched with a scale-invariant feature of each original image corresponding to the hash bucket to which the hash value belongs In the present embodiment, the scale-invariant feature may be, for example, a Scale-invariant Feature Transform (SIFT) feature etc., or a cluster feature generated according to the SIFT feature etc. When the scale-invariant feature is the cluster feature generated according to the SIFT feature, the background server may extract the scale-invariant feature of the image to be searched by extracting SIFT feature points of the image to be searched, and inputting the SIFT feature points into a preset word bag model to cluster the SIFT feature points into K classes, so as to obtain a K-dimensional word bag model feature vector corresponding to the image to be searched.

In the present embodiment, the extraction circuit 72 is further configured to extract a scale-invariant feature of each of the original images; and the generation circuit 75 is further configured to generate a scale-invariant feature library according to the original images and scale-invariant features of the original images, wherein the scale-invariant feature library comprises at least one correspondence between the original images and the scale-invariant features.

In the present embodiment, an image to be searched is acquired; a multi-scale feature and a scale-invariant feature of the image to be searched are extracted; a hash value of the image to be searched is determined according to the multi-scale feature; original images similar to the image to be extracted are obtained by comparing the multi-scale feature of the image to be searched with a multi-scale feature of each original image corresponding to a hash bucket to which the hash value belongs; original images identical to the image to be extracted are obtained by comparing the scale-invariant feature of the image to be searched with a scale-invariant feature of each original image of the hash bucket to which the hash value belongs, so that thumbnails of the identical original images and thumbnails of the similar original images may be displayed to the user, and thereby the user may select a thumbnail from the thumbnails of the identical original images and the thumbnails of the similar original images to acquire an original image corresponding to the thumbnail for display. In this way, a number of thumbnails displayed is increased, which enables the user to select a desired thumbnail from various thumbnails, thereby further improving the search efficiency.

Figure 10:
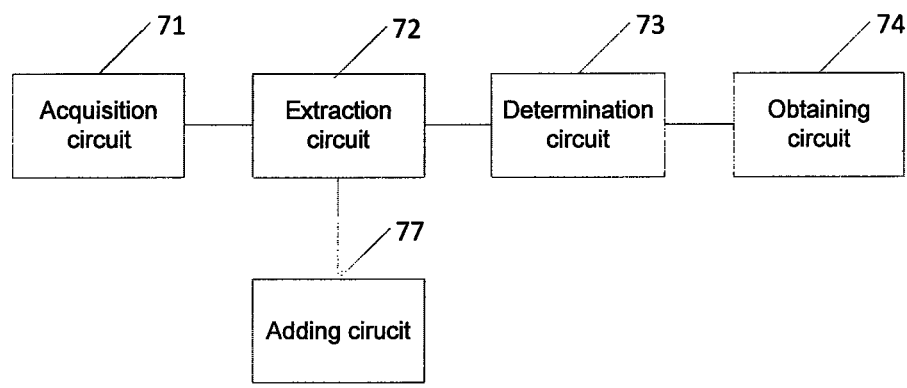
FIG. 10 is a schematic structural diagram of a further image search apparatus according to an embodiment of the present disclosure.

With reference to FIG. 10, on the basis of the embodiment shown in FIG. 7, the apparatus may further comprise an adding circuit 77.

The adding circuit 77 is configured to add first interference information in the original images to obtain first images, wherein the first interference information is consistent with interference information existing in the image to be searched from which the interference information has been removed; and the adding circuit 77 is further configured to add second interference information in the original images to obtain second images, wherein the second interference information is consistent with interference information existing in the image to be searched from which the interference information has not been removed.

The extraction circuit 72 is further configured to extract and store multi-scale features in the first images.

The extraction circuit 72 is further configured to extract and store multi-scale features in the second images.

Correspondingly, the obtaining circuit 74 may specifically be configured to determine whether the interference information has been removed from the image to be searched; obtain the original images similar to the image to be searched by comparing the multi-scale feature of the image to be searched with the multi-scale features of the first images corresponding to the respective original images if the interference information has been removed from the image to be searched; and obtain the original images similar to the image to be searched by comparing the multi-scale feature of the image to be searched with the multi-scale features of the second images corresponding to the respective original images if the interference information has not been removed from the image to be searched In addition, the obtaining circuit 74 may specifically further be configured to, during comparison of the scale-invariant features, obtain the original images identical to the image to be searched by comparing the scale-invariant feature of the image to be searched with the scale-invariant features of the first images corresponding to the respective original images if the interference information has been removed from the image to be searched; and during comparison of the scale-invariant features, obtain the original images identical to the image to be searched by comparing the scale-invariant feature of the image to be searched with the scale-invariant features of the second images corresponding to the respective original images if the interference information has not been removed from the image to be searched.

In the present embodiment, there is a certain interference in the image to be searched. Even if the interference information has been removed from the image to be searched, there is still a small amount of interference. Since the original image is an image which may be displayed on the painting screen and from which the interference information has been removed and thus the original image has little interference information, a certain amount of interference may be added in the original image, so that the interferences in the image to be searched are consistent with the interferences in the original image, so as to ensure consistency between a number of interferences in the image to be searched and a number of interferences in the original image, thereby further reducing the influence of the interference information on the calculation of the similarities, and further improving the search efficiency.

The present disclosure further provides an image search system, comprising: a painting screen, the mobile terminal, and a server, wherein the mobile terminal is configured to capture an image to be searched, upload the image to be searched to the server, acquire a search result returned by the server, and push, through the server, an image selected by a user in the search result to the painting screen for display; and the server has stored thereon an index library comprising at least one hash bucket, a multi-scale feature library, and a scale-invariant feature library, and is configured to receive the image to be searched which is uploaded by the mobile terminal, invoke an image search method to search for original images identical to the image to be searched and/or original images similar to the image to be searched, push the identical original images and/or the similar original images to the mobile terminal as the search result, and push the image selected by the user in the search result to the painting screen for display.

The image search method is the image search method as described in FIGS. 1, 4, and 6.

Figure 11:
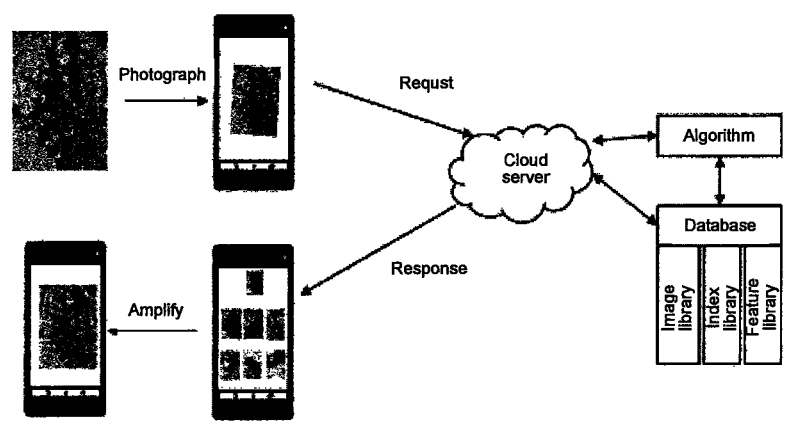
FIG. 11 is a schematic diagram of an image search system according to an embodiment of the present disclosure.

Here, a search diagram of the image search system may be as shown in FIG. 11. In FIG. 11, the server is a cloud servicer, and the mobile terminal invokes a camera to photograph a real image using, for example, a painting screen APP, to capture an image to be searched, and uploads the image to be searched to a cloud servicer. The cloud servicer invokes an algorithm, for example, an image search method to operate on a database to search for original images identical to the image to be searched and original images similar to the image to be searched; and provides a search result to the painting screen APP which displays an image selected by a user, or pushes the image selected by the user to the painting screen for display. Here, the database comprises: an image library, an index library, and feature libraries comprising a multi-scale feature library and a scale-invariant feature library.

The present disclosure further provides an image search device, comprising: a memory, a processor and a computer program stored on the memory and executable on the processor, wherein the program, when executed by the processor, implements the image search method as described above.

Figure 12:
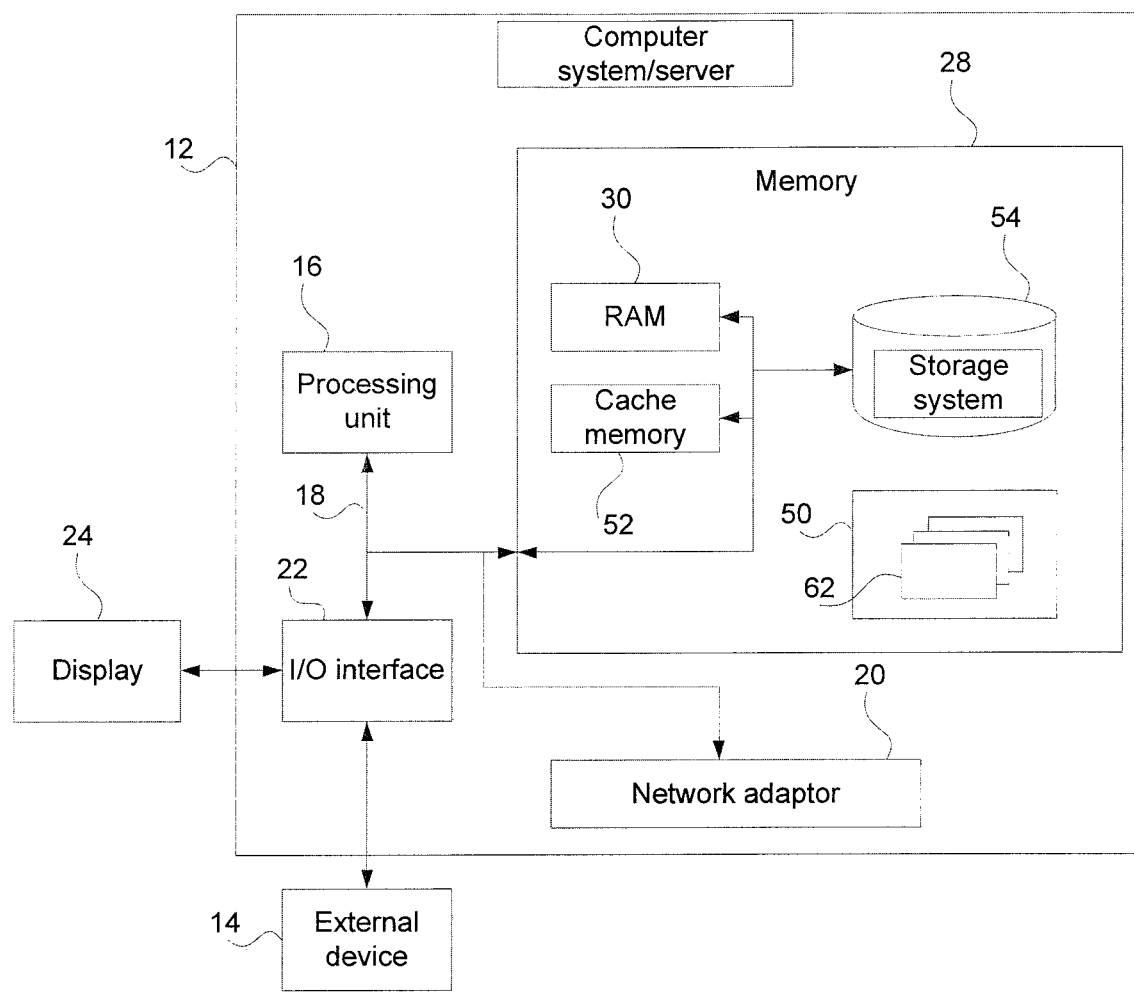
FIG. 12 is a schematic structural diagram of a computer device according to an embodiment of the present disclosure.

FIG. 12 illustrates a block diagram of an exemplary computer device suitable for implementing the embodiments of the present disclosure. The computer device 12 shown in FIG. 12 is merely an example and should not impose any limitation on functions and a usage scope of the embodiments of the present disclosure.

As shown in FIG. 12, the computer device 12 is implemented in a form of a general-purpose computing device. Components of the computer device 12 may include, but not limited to, one or more processors or processing units 16, a system memory 28, a bus 18 for connecting different system components (including the system memory 28 and the processing unit 16.)

The bus 18 represents one or more of several types of bus structures, including a memory bus or memory controller, a peripheral bus, a graphics acceleration port, a processor, or a local bus using any of a variety of bus structures. For example, these architectures include, but not limited to, an Industry Standard Architecture (ISA for short hereinafter) bus, a Micro Channel Architecture (MAC for short hereinafter) bus, an enhanced ISA bus, a Video Electronics Standards Association (VESA for short hereinafter) local bus and a Peripheral Component Interconnect (PCI for short hereinafter) bus.

The computer device 12 typically comprises a variety of computer system readable media. These media may be any available media which can be accessed by the computer device 12, including volatile and non-volatile media, and removable and non-removable media.

The memory 28 may comprise computer system readable media in a form of volatile memory, such as a Random Access Memory (RAM for short hereinafter) 30 and/or a cache memory 52. The computer device 12 may further comprise other removable/non-removable, and volatile/non-volatile computer system storage media. By way of example only, a storage system 54 may be used to read from and write into non-removable and non-volatile magnetic media (not shown in FIG. 12, commonly referred to as "hard drivers".) Although not shown in FIG. 12, a magnetic disk driver for reading from and writing into a removable and non-volatile magnetic disk (for example, a "floppy disk") and an optical disk driver for reading from and writing into a removable and non-volatile optical disk (for example, a Compact Disc Read Only Memory (CD-ROM for short hereinafter), a Digital Video Disc Read Only Memory (DVD-ROM for short hereinafter), or other optical media.) In these cases, each driver may be connected to the bus 18 via one or more data medium interfaces. The memory 28 may comprise at least one program product having a group of (for example, at least one) program modules which are configured to perform the functions of various embodiments of the present application.

A program/utility 50 having a group of (at least one) program modules 62 may be stored in the memory 28, for example. Such program modules 62 include, but not limited to, an operating system, one or more applications, other program modules and program data, and each or some combination of these examples may include implementations of a network environment. The program modules 42 generally perform the functions and/or methods in the embodiments described in the present application.

The computer device 12 may also communicate with one or more external devices 14 (for example, a keyboard, a pointing device, a display 24, etc.), may also communicate with one or more devices which enable a user to interact with the computer system/server 12, and/or any device (for example, a network card, a modem etc.) which enables the computer system/server 12 to communicate with one or more other computing devices. This communication may be performed through an Input/Output (I/O) interface 22. Moreover, the computer device 12 may also communicate with one or more networks (for example, a Local Area Network (LAN for short hereinafter), a Wide Area Network (WAN for short hereinafter) and/or a public network (for example, the Internet) through a network adapter 20. As shown, the network adapter 20 communicates with other modules of the computer device 12 via the bus 18. It should be appreciated that, although not shown, other hardware and/or software modules may be used in conjunction with the computer device 12, including, but not limited to: a microcode, a device driver, a redundant processing unit, an external magnetic disk driving array, a RAID system, a tape driver and a data backup storage system etc.

The processing unit 16 executes various kinds of functional applications and data processing by executing a program stored in the system memory 28, for example, the method mentioned in the embodiments described above.

The present disclosure further provides a non-transitory computer-readable storage medium on which computer programs are stored. The programs, when executed by a processor, implements the image search method described above.

The present disclosure further provides a computer program product. Instructions in the computer program product, when executed by a processor, implement the image search method described above.

In the description of the present specification, the description referring to the terms "one embodiment", "some embodiments", "an example", "a specific example", or "some examples" etc. means that a specific feature, structure, material or characteristics described in conjunction with the embodiment or example is included in at least one embodiment or example of the present disclosure. In the present specification, schematic expressions of the above terms do not necessarily have to refer to the same embodiment or example. Furthermore, the specific feature, structure, material, or characteristics described may be combined in any suitable manner in any one or more embodiments or examples. In addition, those skilled in the art can combine and merge different embodiments or examples described in the present specification and features in different embodiments or examples without conflicting with each other.

Furthermore, the terms "first" and "second" are used for descriptive purposes only, and are not to be construed as indicating or implying relative importance or implicitly indicating a number of indicated technical features. Thus, features defined by "first" and "second" may explicitly or implicitly indicate that least one of the features is included.

In the description of the present disclosure, "plurality"

means at least two, such as two, three, etc., unless explicitly and specifically defined otherwise.

Any process or method described in the flowcharts or described elsewhere herein may be construed as meaning circuits, sections, or portions including codes of executable instructions of one or more steps for implementing a custom logic function or process. Further, the scope of the preferred implementations of the present disclosure includes additional implementations in which functions may be performed in a substantially simultaneous manner or in a reverse order, depending on the functions involved, instead of the order shown or discussed, which should be understood by those skilled in the art to which the embodiments of the present disclosure pertain.

A logic and/or steps represented in the flowcharts or otherwise described herein, for example, may be considered as a sequence listing of executable instructions for implementing logical functions, and may be embodied in any computer-readable medium for use by an instruction execution system, apparatus or device (for example, a computer-based system, a system including a processor or other systems which may obtain instructions from the instruction execution system, apparatus or device and may execute the instructions), or may be used in combination with the instruction execution system, apparatus or device. As for this specification, a "computer-readable medium" may be any means which may contain, store, communicate, propagate, or transmit programs for use by or in connection with the instruction execution system, apparatus, or device. More specific examples (non-exhaustive listings) of the computer-readable media include an electrical connection part (an electronic apparatus) having one or more wirings, a portable computer disk cartridge (a magnetic apparatus), a Random Access Memory (RAM), a Read Only Memory (ROM), an Erasable and Programmable Read Only Memory (EPROM) or a flash memory, a fiber optic apparatus, and a portable Compact Disc-Read Only Memory (CD-ROM). In addition, the computer-readable media may even be paper or other suitable medium on which the programs may be printed, as the programs may be obtained electronically by optically scanning the paper or the other medium and then editing, interpreting, or performing other suitable processing (if necessary) on the paper or the other medium, and then the programs are stored in a computer memory.

It should be understood that portions of the present disclosure may be implemented in hardware, software, firmware, or a combination thereof. In the above embodiments, a plurality of steps or methods may be implemented using software or firmware stored in a memory and executed by a suitable instruction execution system. For example, if implemented in hardware, as in another embodiment, it can be implemented using any one or a combination of the following techniques known in the art: discrete logic gates having logic gate circuits for implementing logic functions on data signals, an application-specific integrated circuit having a suitable combinational logic gate circuit, a Programmable Gate Array (PGA), a Field Programmable Gate Array (FPGA), etc.

It can be understood by those of ordinary skill in the art that all or a part of steps carried in the method according to the embodiments may be completed by programs instructing a related hardware. The programs may be stored in a computer-readable storage medium. When executed, the programs include one or a combination of the steps of the method embodiments.

In addition, various functional units in various embodiments of the present disclosure may be integrated in one processing circuit, or may exist alone physically, or two or more units may be integrated in one circuit. The integrated circuit may be implemented in a form of hardware or in a form of a software functional circuit. The integrated circuit may also be stored in a computer readable storage medium if it is implemented in a form of a software functional circuit and sold or used as an independent product.

The above-mentioned storage medium may be a read-only memory, a magnetic disk or an optical disk, etc. Although the embodiments of the present disclosure have been shown and described above, it can be understood that the above embodiments are exemplary and are not to be construed as limiting the present disclosure, and those of ordinary skill in the art can make changes, modifications, substitutions and variations to the above embodiments within the scope of the present disclosure.

We claim:

1. An image search method, comprising:
acquiring an image to be searched;
extracting a multi-scale feature of the image to be searched;
determining a hash value of the image to be searched according to the multi-scale feature; and
obtaining original images similar to the image to be searched by comparing the multi-scale feature of the image to be searched with a multi-scale feature of each original image corresponding to a hash bucket to which the hash value belongs;
wherein before obtaining the original images similar to the image to be searched, the method further comprises:
acquiring a plurality of original images;
extracting a multi-scale feature of each of the original images, and determining a hash value of the original image according to the multi-scale feature of the original image;
generating an index library according to the original images and hash values of the original images, wherein the index library comprises at least one hash bucket, and each of the at least one hash bucket comprises at least one of correspondences between the hash values and the original images; and
generating a multi-scale feature library according to the original images and multi-scale features of the original images, wherein the multi-scale feature library comprises at least one correspondence between the original images and the multi-scale features.

2. The method according to claim 1, further comprising:
extracting a scale-invariant feature of the image to be searched; and
obtaining original images identical to the image to be searched by comparing the scale-invariant feature of the image to be searched with a scale-invariant feature of each original image corresponding to the hash bucket to which the hash value belongs.

3. The method according to claim 2, wherein before obtaining the original images identical to the image to be searched, the method further comprises:
extracting a scale-invariant feature of each of the original images; and
generating a scale-invariant feature library according to the original images and scale-invariant features of the original images, wherein the scale-invariant feature library comprises at least one correspondence between the original images and the scale-invariant features.

4. The method according to claim 3, wherein obtaining the original images identical to the image to be searched comprises:
- determining, for each original image, a second similarity between the original image and the image to be searched by comparing a scale-invariant feature of the original image with the scale-invariant feature of the image to be searched; and
- determining the original image to be the original images identical to the image to be searched when the second similarity satisfies a second threshold.

5. The method according to claim 1, wherein before extracting the multi-scale feature of the image to be searched, the method further comprises:
- removing interference information from the image to be searched.

6. The method according to claim 1, wherein obtaining the original images similar to the image to be searched comprises:
- determining, for each original image, a first similarity between the original image and the image to be searched by comparing a multi-scale feature of the original image with the multi-scale feature of the image to be searched; and
- determining the original image to be an original image similar to the image to be searched when the first similarity satisfies a first threshold.

7. The method according to claim 1, wherein before obtaining the original images similar to the image to be searched, the method further comprises:
- adding first interference information in the plurality of original images to obtain first images, wherein the first interference information is consistent with interference information existing in the image to be searched from which the interference information has been removed;
- adding second interference information in the original images to obtain second images, wherein the second interference information is consistent with interference information existing in the image to be searched from which the interference information has not been removed;
- extracting and storing multi-scale features in the first images; and
- extracting and storing multi-scale features in the second images.

8. The method according to claim 7, wherein obtaining the original images similar to the image to be searched comprises:
- determining whether the interference information has been removed from the image to be searched;
- obtaining the original images similar to the image to be searched by comparing the multi-scale feature of the image to be searched with the multi-scale features of the first images corresponding to the respective original images if the interference information has been removed from the image to be searched; and
- obtaining the original images similar to the image to be searched by comparing the multi-scale feature of the image to be searched with the multi-scale features of the second images corresponding to the respective original images if the interference information has not been removed from the image to be searched.

9. The method according to claim 1, wherein after obtaining the original images similar to the image to be searched, the method further comprises:
- displaying thumbnails corresponding to the respective similar original images;
- acquiring a selection request from a user, wherein the selection request comprises a thumbnail selected by the user; and
- acquiring an original image according to the thumbnail selected by the user, and pushing the original image to a painting screen for display.

10. The method according to claim 1, wherein the multi-scale feature and the hash value of the image to be searched are obtained by inputting the image to be searched into a deep hash model, and
- the deep hash model comprises at least three layers of convolutional neural networks, wherein an output of an intermediate layer of convolutional neural network comprises multi-scale features and hash values, and an output of a last layer of convolutional neural network is labels in images and a value indicating whether the two images are the same.

11. The method according to claim 10, wherein the deep hash model is trained according to training data comprising a plurality of training samples, and
- each of the training samples comprises: two images, labels in the two images, and a value indicating whether the two images are the same.

12. An image search device, comprising:
- a memory, a processor and a computer program stored on the memory and executable on the processor, wherein the program, when executed by the processor, implements the image search method according to claim 1.

13. A non-transitory computer readable storage medium, having stored thereon a computer program which, when executed by a processor, implements the image search method according to claim 1.

14. An image search method, comprising:
- acquiring an image to be searched;
- extracting a multi-scale feature of the image to be searched;
- determining a hash value of the image to be searched according to the multi-scale feature; and
- obtaining original images similar to the image to be searched by comparing the multi-scale feature of the image to be searched with a multi-scale feature of each original image corresponding to a hash bucket to which the hash value belongs;

wherein the method further comprises:
- extracting a scale-invariant feature of the image to be searched; and
- obtaining original images identical to the image to be searched by comparing the scale-invariant feature of the image to be searched with a scale-invariant feature of each original image corresponding to the hash bucket to which the hash value belongs.

15. The method according to claim 14, wherein before obtaining the original images identical to the image to be searched, the method further comprises:
- extracting a scale-invariant feature of each of the original images; and
- generating a scale-invariant feature library according to the original images and scale-invariant features of the original images, wherein the scale-invariant feature library comprises at least one correspondence between the original images and the scale-invariant features.

16. The method according to claim 15, wherein obtaining the original images identical to the image to be searched comprises:
- determining, for each original image, a second similarity between the original image and the image to be searched by comparing a scale-invariant feature of the original image with the scale-invariant feature of the image to be searched; and determining the original image to be the original images identical to the image to be searched when the second similarity satisfies a second threshold.

17. The method according to claim 14, wherein after obtaining the original images similar to the image to be searched, the method further comprises:

displaying thumbnails corresponding to the respective similar original images;

acquiring a selection request from a user, wherein the selection request comprises a thumbnail selected by the user; and acquiring an original image according to the thumbnail selected by the user, and pushing the original image to a painting screen for display.

18. The method according to claim 14, wherein the multi-scale feature and the hash value of the image to be searched are obtained by inputting the image to be searched into a deep hash model, and the deep hash model comprises at least three layers of convolutional neural networks, wherein an output of an intermediate layer of convolutional neural network comprises multi-scale features and hash values, and an output of a last layer of convolutional neural network is labels in images and a value indicating whether the two images are the same.

19. The method according to claim 18, wherein the deep hash model is trained according to training data comprising a plurality of training samples, and each of the training samples comprises: two images, labels in the two images, and a value indicating whether the two images are the same.

* * * * *